(12) United States Patent
Keith (10) Patent No.: US 8,515,853 B2
(45) Date of Patent: Aug. 20, 2013

(54) ORDER MATCH INSURANCE

(76) Inventor: Christopher Keith, New York, NY (US)

( * ) Notice: Subject to any disclaimer, the term of this patent is extended or adjusted under 35 U.S.C. 154(b) by 2503 days.

(21) Appl. No.: 10/741,874

(22) Filed: Dec. 19, 2003

(65) Prior Publication Data

US 2004/0236614 A1 Nov. 25, 2004

Related U.S. Application Data (63) Continuation of application No. PCT/US02/20174, filed on Jun. 25, 2002.

(60) Provisional application No. 60/339,197, filed on Dec. 10, 2001, provisional application No. 60/302,979, filed on Jul. 2, 2001.

(51) Int. Cl.
*G06Q 40/00* (2012.01)

(52) U.S. Cl.
USPC .................. 705/37; 705/4; 705/35; 705/36 R (58) Field of Classification Search
USPC ........................... 705/1, 35, 36 R, 37
See application file for complete search history.

(56) References Cited

U.S. PATENT DOCUMENTS

| | | | |
|---|---|---|---|
| 3,581,072 A * | 5/1971 | Nymeyer | 705/37 |
| 4,953,085 A | 8/1990 | Atkins | |
| 5,689,652 A * | 11/1997 | Lupien et al. | 705/37 |
| 5,911,135 A | 6/1999 | Atkins | |
| 5,911,136 A | 6/1999 | Atkins | |
| 6,061,662 A | 5/2000 | Makivic | |
| 7,099,839 B2 * | 8/2006 | Madoff et al. | 705/37 |
| 7,428,506 B2 * | 9/2008 | Waelbroeck et al. | 705/37 |
| 2002/0194107 A1 * | 12/2002 | Li et al. | 705/37 |

OTHER PUBLICATIONS

Quantifying Best Execution At the New York Stock Exchange: Market Orders, Jeffery Bacidore, Katharine Ross and George Sofianos, NYSE Working Paper 99-05, Dec. 1999, 57 pages.*
WO 03005150 A3 International Search Report Order Match Insurance, 3 pages.*

* cited by examiner

*Primary Examiner* — Olabode Akintola
*Assistant Examiner* — Kellie Campbell
(74) *Attorney, Agent, or Firm* — Brenda Pomerance (57) ABSTRACT

A dealer sells match insurance to participants in an order matching process. If a participant's order is not matched in the match process, then the participant can exercise the match insurance to obtain a contra-side order that matches. Purchasing match insurance is similar to purchasing an option with a floating strike price; with the strike price being determined by the match price. The match insurance itself may be tradeable. Matching orders are executed. A participant may cancel some or all of its match insurance before the match occurs and the dealer refunds the insurance premium less a cancellation fee. Traders not participating in the match may obtain an immediate execution guarantee from the dealer, at the next match price, by paying a fee.

11 Claims, 4 Drawing Sheets

301: DEALER NAME  IMMED GTEE EXEC'N FEE  DATE
    SYMBOL NAME   CANCELLATION FEE       TIME

302: -------- PUBLIC RATES --------
    BUY INSURANCE        SELL INSURANCE
    QTYB0 @ PR0          QTYS0 @ PR0
    QTYB1 @ PR-1         QTYS1 @ PR+1
    QTYB2 @ PR-2         QTYS2 @ PR+2
    QTYB3 @ PR-3         QTYS3 @ PR+3

303: -------- PRIVATE RATES --------
    CUSTOMER 20   ADDITIONAL QTYC20 AT PUBLIC RATES
    CUSTOMER 21   DISCOUNT 10% FROM PUBLIC RATES

| SYMBOL | SIDE | QUANTITY | RELATIVE-PRICE | NO. MATCHES | DISTRIBUTION |
|--------|------|----------|----------------|-------------|--------------|
| 351    | 353  | 355      | 357            | 359         | 361          |

ORDER MATCH INSURANCE

This application is a continuation of PCT/US 02/20174, filed 25 Jun. 2002, which claims the benefit of U.S. provisional patent application No. 60/302,979, filed 2 Jul. 2001, and U.S. provisional patent application No. 60/339,197, filed 10 Dec. 2001.

BACKGROUND OF THE INVENTION

The present invention relates to stimulating liquidity in financial markets, and more particularly, is directed to providing insurance that an order submitted to an order matching process will be matched.

In an order match process, buy and sell orders are accumulated for a period of time, and then the accumulated orders are matched. The accumulation period may be time driven, that is, matches occur periodically, or volume driven, that is, matches occur when a predetermined volume of orders have been accumulated, or some combination thereof.

The price at which the orders are matched is typically determined by reference to an external price, that is, a price from another market. For example, the price in the external market at the instant that the match occurs can be used. More specifically, prices are usually quoted as a pair: a bid price and an offer price. In the simplest case, the midpoint of the bid-offer quote is used as the match price.

For some trading instruments, prices can vary greatly during a trading day; this characteristic is referred to as "price volatility." A so-called daily volume weighted average price (VWAP) metric has been defined as the value of all transactions in a trading day divided by the number of shares traded. Traders are often evaluated based on how far the price they obtained deviates from VWAP. By splitting an order into smaller orders that are executed periodically during the day, a trader can artificially mimic a VWAP price. Typically, trading volume peaks at the opening and closing of the trading day, is minimal around lunchtime, and is intermediate at other points.

POSIT is an electronic equity-matching execution tool offered by ITG Inc., New York, N.Y. Buy and sell orders, including both individual stocks and portfolios, are entered into the system from many sources. Eight times daily—9:40, 10:00, 10:30 and hourly from 11:00 to 3:00 Eastern Time— the POSIT computer processes and compares all orders confidentially. For maximum security, each match is run at a randomly selected time within a five-minute window immediately following the scheduled match time.

POSIT trades are priced relative to the stock's primary market at the moment the match is run. Trades are matched at the midpoint of the bid/offer spread. Those order which match are automatically executed. Immediately after each match, clients receive electronic reports showing match results for their orders. Clients then decide whether to keep unmatched orders in the system for future matches or to execute them by other means.

POSIT touts its advantages as: (i) confidentiality that eliminates unfavorable market impact resulting from trading in an open arena, (ii) low commission costs due to a highly automated infrastructure, and (iii) mid-point pricing enables users to save half of the bid/offer spread.

The so-called POSIT 4 system enables matching stocks based on characteristics rather than stock name alone, providing the possibility of improved liquidity, reduced transaction costs and reduced risk. This dynamic substitution and risk control capability can be used for:

contingent orders, such as, "If the ratio between the match prices for 'ABC' and 'XYZ' is greater than 1.2, then buy up to $100,000 of 'ABC' and sell short an equivalent number of dollars of 'XYZ', maintaining the dollar balance to within one round-lot. But if I cannot get at least 1000 shares of each name done, I don't want to make the trade."

sector balancing, such as, "I use the BARRA industry group definitions and my universe is the Russell 1000®. I currently hold the following allocations: oil $10 MM, paper $5 MM, aluminum $5 MM, and would like to move into: oil $7 MM, beverages $8 MM, cash $5 MM. I will only trade if I can get a minimum of $1M in total done in the match with no less than $10,000 traded in any single name."

principal guarantee bid, such as, "I have a two-sided list that I eventually want to send out for bid. The bid dollar imbalance and the total risk are high and the bid will be expensive. I want to do some advance trading in POSIT to reduce the costs of the bid, but will trade only if it will reduce or at least not increase the list's risk and dollar imbalance. All things being equal, I want to trade illiquid names before liquid ones."

index fund management, such as, "My portfolio tracks the Russell 1000%, and my current tracking error is too high. I will trade any Russell 1000 name that will reduce my tracking error, so long as I trade at least $10,000 of any single name."

ITG suggests a "VWAP Strategy" to assist in executing portfolios using the VWAP benchmark. Step 1 is to identify eligible VWAP orders. Orders that would be more appropriately traded by other means, such as illiquid blocks and most OTC names, are separated from the portfolio during a pre-trade analysis. Cost estimates against the VWAP benchmark are generated for the remaining portfolio using a proprietary pricing algorithm. Step 2 is to employ intelligent volume distribution. Trade volume is distributed over the day using historical volume data to recommend order sizes to be traded at the open, the close and each of the 12 half-hour intervals during the trading day. Step 3 is to maximize price improvement using intelligent trading rules that dynamically adapt to market conditions to determine the best way to trade the shares within each time interval. Proprietary limit order setting rules are systematically applied to maximize price improvement during the day based on market conditions. The strategy automatically routes orders to POSIT during trading intervals that correspond with one of the eight regular daily POSIT matches. Residual orders are returned to the VWAP execution list. Step 4 is to analyze results using reports with varying time horizons. VWAP trades are executed on an agency basis, with a choice of either a fixed commission or an incentive pricing arrangement.

A VWAP SmartServer is operative to transmit orders to multiple markets including POSIT. In response to portfolios from users, the SmartServer creates, monitors and executes orders based on expected volume patterns and current market conditions.

A problem with order matching processes is that there is usually a market imbalance, that is, more volume on the buy side than the sell side, or vice versa. Accordingly, only a small percentage of orders are actually matched. Historically, the match rate was around 10%, meaning one in ten orders matched, which is a low liquidity. POSIT has achieved slightly better performance. Knowing that the match efficiency is low, parties refrain from submitting their orders to the match process, further reducing the liquidity of the process.

Thus, there is a need for a way to stimulate the liquidity of the match process.

SUMMARY OF THE INVENTION

In accordance with an aspect of this invention, there is provided a method of providing match insurance, comprising posting a match insurance rate quote, receiving a match insurance request, and granting match insurance in response to the match insurance request in accordance with the posted match insurance rate quote.

It is not intended that the invention be summarized here in its entirety. Rather, further features, aspects and advantages of the invention are set forth in or are apparent from the following description and drawings.

DETAILED DESCRIPTION

A dealer sells match insurance to participants in an order matching process. If a participant's order is not matched in the match process, then the participant exercises the match insurance via manual exercise or automatic exercise to obtain a contra-side execution from the dealer. Purchasing match insurance is similar to purchasing an option with a floating strike price; with the strike price being determined by the match price. The match insurance itself may be tradeable, just as an option is tradeable independently of the item underlying the option. Matching orders are executed.

A participant may cancel some or all of its match insurance such as after part of an order has been matched, and part remains to be matched, and the dealer refunds the insurance premium less a cancellation fee.

Traders not participating in the match may obtain an immediate execution guarantee from the dealer, at the next match price, by paying a fee.

Qualified parties other than the dealer, such as large pension funds or large index funds, can submit reinsurance market quotes. Essentially, the qualified parties who submit reinsurance market quotes are trading at a negative trading cost, because the participants have higher time urgency in obtaining executions than the qualified parties. These qualified parties participate in the reinsurance market by providing underlying securities to the dealer in the event that match insurance sold by the dealer is exercised.

Since the insurance is sold via an automated system, transaction costs are low.

In one embodiment, the match accepts limit and market orders with the market orders priced by the volume imbalance in buy and sell orders versus the published liquidity curve, the matching having an important feature of guaranteed liquidity due to match insurance. If the liquidity curve is flat, that is, not sensitive to the volume imbalance, then the match operates in a conventional manner.

In another embodiment, the match accepts only market orders and the match price is based on future activity, such as the VWAP for the time interval between the current match and the next match, the matching having an important feature of guaranteed liquidity due to match insurance.

In other embodiments, the match is based on other functions of past, current and future external prices.

The following terms are used herein:

"Best Pool" refers to a commitment a dealer makes to selected users ("best customers") as opposed to users in general, guaranteeing some number of shares at a match. In this case, the dealer will know if a customer has made use of the Best Pool commitment.

"Blind Pool" refers to a commitment a dealer makes to users in general of willingness to guarantee the execution of an indicated number of shares, buy or sell, at a match. Thus a bind pool might be 50,000 buy and sell in a selected stock. While the dealer can limit the amount individual firms can take from this pool, it is called "blind" because the dealer will not know who buys the insurance.

"Dealer Obligation" as used here refers to the shares the dealer must buy or sell as a result of having made the match guarantee (i.e. "insurance"). Thus, if a dealer sells a party 50,000 shares of Buy insurance (guarantees that the party will match not less than 50,000 shares), and the party only gets 20,000 shares at the match naturally, the dealer has an obligation to sell 30,000 shares to the user at the WVAP pricing period for that match.

"Special Pool" is the name given to commitments made by the dealer on a case-by-case basis in response to inquiries from customers.

"Match Period" extends from a given match, or system open if the match is the first of the day, until the next match, or the end of a match interval, if the match is the last.

VWAP as used here is a price which is the weighted average of all executions in the appropriate market taking place from one Match Period to the next.

Dealer Match is an equities trading match that is run periodically throughout the trading day. A trading match is a methodology where traders place un-priced buy and sell orders in a book. The orders wait in the book until the match is run. When the match runs, the buy orders are paired with the sell orders. If there is an imbalance in the buy and sell orders, the smaller side is allocated to the larger side proportionately. All orders are initially paired, but the proportion each order is allocated may be smaller than the order's minimum lot size, and thus it is not paired. All paired orders are executed at the same price for their corresponding period. The price is determined by an external pricing source.

In one embodiment, the Dealer Match execution price for each period is based on volume weighted average price (VWAP) of the next period (forward looking VWAP over n periods). Orders that are not filled in one match can be "rolled" (posted) to the next match of the day.

In order to increase the volume of trades matched in each period a trader can purchase insurance to guarantee that its order will be matched (executed). Dealer Match insurance is provided by a dealer willing to guarantee that there will be liquidity to fill the imbalance between the Buy and Sell orders posted to the match. Insured shares are executed in historic time slice proportions. Uninsured shares are put (in total) into the first available match, and any unexecuted shares in the match are rolled into the next Match Period (if that is consistent with the defined number of Match Periods). The dealer can also have individual agreements with traders to guarantee the execution of a specific quantity and the corresponding insurance price to be applied.

Irrespective of the dealer commitments and/or participation, the execution price of the orders is always determined by the VWAP for the particular Match Period. The Dealer Match System acts as the counter-party to every trade so that the identity of the actual contra is not revealed. The insurance for each stock listed on Dealer Match is provided by a single dealer (one dealer per stock). The actual number of Match Periods can be varied on a stock-by-stock basis to respond to market trends, however, in this embodiment, six (6) Match Periods per day are used. The scheduled periods are published in advance and are made available to the participating traders and dealers.

The price that is used for executions in each Match Period is a forward-looking VWAP. Dealer Match computes the VWAP price from the Match Period, which extends from the price at the previous instant of match until the next instant of match, and includes all trades in the market in between. Once the execution price has been determined for a match it will be applied for all the matched (executed) trades in the particular period.

Since there is usually an imbalance on either the buy or sell side of a match, an order placed at a standard match may not be completely filled at the end of the match, or even after being "rolled" into all the matches of the day. In order to increase the volume of trades matched in each period the trader can purchase insurance to guarantee that his/her order will be matched (executed). Dealer Match insurance is provided by a dealer willing to guarantee that there will be liquidity on either side to fill the imbalance between the Buy and Sell orders posted to the match.

The dealer allocates a certain number of shares to each Match Period to be used as a "blind" pool for insuring trades on a first-in-first-served basis. The dealer determines his allocation to the Blind Pool based on his agreement with the Dealer Match service. The number of shares available for insurance is published in advance to the traders. The trader requesting insurance on a specific number of shares will be informed whether the insurance was granted and for how many shares.

The dealer can specify an insurance limit on a per-firm basis, so the amount of insurance that the trader can purchase will depend on the firm's limit and the amount left in the "pool". Insurance purchased from the "pool" is sold on a first-come first-served basis for each match.

There are two classes of match insurance limits. Firms may open special accounts with the dealer who will grant them "best customer" credit lines. The amount of insurance the dealer has committed from the "best" pool to satisfy the match is not anonymous, since the dealer knows how much he has committed to which firms.

Those firms that desire total anonymity can purchase insurance for their orders using the "blind" pool account. The firm gets the lesser of the insurance available for all in the Blind Pool and the firm's own limit in the Blind Pool.

An institution that does not necessarily have a specific interest in executing trades at a time or price can make inventory available to a dealer(s). Prior to any Match Period, the dealer and the institution agree to a fee per share, which the dealer will pay to the institution if the dealer calls upon the institution's shares in order to supplement his obligations to participants in the match.

Shares available as reinsurance inventory are a resource to the dealer, and part of a separate agreement (from Dealer Match) between the dealer and the institution.

For insured orders, trades are allocated to each of the day's Match Periods using a time/slice methodology in order to arrive at simulated VWAP (a certain percentage of the total order is allocated to first match and the balance is spread evenly over the remaining five).

Insured shares are executed in historic time slice proportions. Uninsured shares are put (in total) into the first available match, and any unexecuted shares in the match are rolled into the next Match Period (if that is consistent with the defined number of Match Periods).

Rules governing dealer allocation of insurance:

Liquidity in the Blind Pool is allocated on a first request first served basis.

The Dealer can limit the amount of insurance to be allocated from the Blind Pool to a specific customer (firm).

The dealer can roll to the next match both any amount of unused insurance, and any amount of un-purchased insurance, from the current match.

A dealer's obligation may be rolled over to the next match. If this happens, the rolled-over obligation becomes a priority order in the next match.

Rules governing entering of orders and purchasing of insurance will now be discussed.

The trader can specify the number of Match Periods that the order should be entered in to. If the trader specifies that the order can be in only one Match Period, then at the end of the period any unfilled portion of the order is cancelled. If an insured share is not matched, the dealer provides the missing Buy or Sell. If the firm did not specify the number of Match Periods for an order, then any unmatched portion of the order would be rolled (posted) to the next match of the day. Any portion of an order that is unmatched at the end of the day's trading is cancelled.

The firm (trader) pays a fee per share for all insurance purchased. A trader may cancel uninsured shares at any time. If shares have been insured, the trader must execute a minimum amount. There will be a cancellation charge, which will be added to the charge for shares executed.

The dealer knows three things: the amount of insurance sold in the Blind Pool, the amount of insurance sold to each member of the best or special pools, and the total number of shares that he or she must buy or sell at the next VWAP. The dealer will have no knowledge as to the total number of shares entered into the Match Period which have not requested insurance. The firm (trader) will have full knowledge of how much insurance has been provided in the Blind Pool at the start of the match, but will have no knowledge as to the total amount of insurance granted in the Blind Pool. There is only one clearing agent for Dealer Match, and the clearing agent appears as the contra party for every trade.

Figure 1:
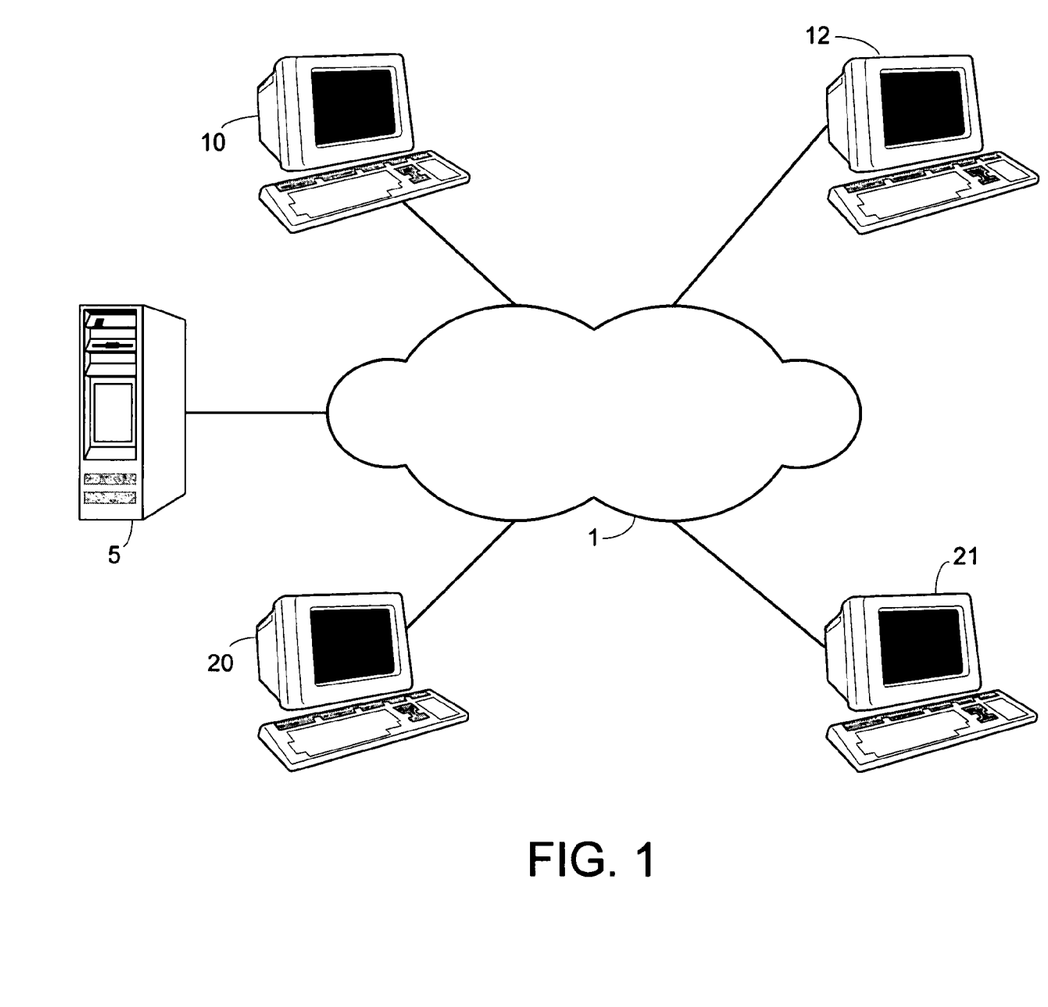
FIG. 1 is a system block diagram showing the environment of the present invention.

FIG. 1 is a system block diagram showing the environment of the present invention. Communication network 1, which may be the Internet, is coupled to each of matching system 5, dealer 10, reinsurer 12, and market participants 20 and 21, also referred to as customers or traders. Suitable computer and communication facilities are present at each location. In some embodiments, matching system 5 is operated by dealer 10. In other embodiments, matching system 5 is operated by a party (not shown) other than dealer 10.

Figure 2:
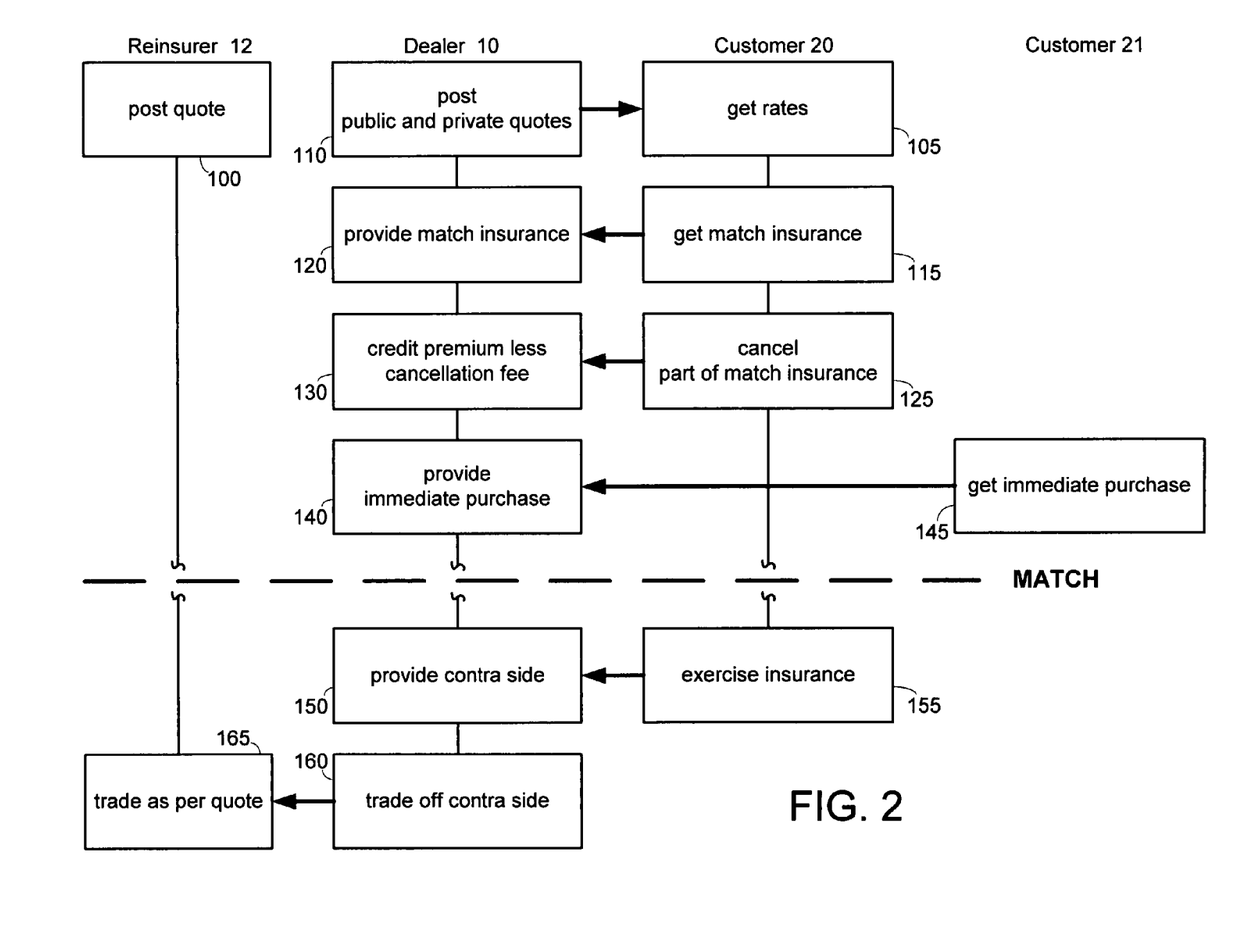
FIG. 2 is a flowchart of operation of the present invention.

FIG. 2 is a flowchart of operation of the present invention.

An embodiment wherein the match uses a liquidity curve will now be described.

At a time prior to the match, dealer 10 publishes a liquidity curve for a stock showing price vs. volume imbalance. This liquidity curve is fixed for the match. The dealer defines the liquidity curve so as to maximize participation. For instance it should show some price discovery but, to encourage large orders, might be comparatively insensitive. By selection of the liquidity curve, the dealer balances risk versus appeal to order flow. A horizontal curve, like a match, will attract order flow but increase dealer risk. A steep curve will reduce dealer risk but presumably order flow as well.

The liquidity curve plots share imbalance against price change, with the price change being measured relative to a specified price, such as the midpoint of the buy-sell quote spread from an external market at the time the match starts. For example, at the start of the match starts if there are 80,000 buy share orders and 150,000 sell share orders, then there is an imbalance of 70,000 shares on the sell side. The imbalance is used to determine a point on the curve, and thus to specify the price change. For example, a price change of −2 might mean that the auction match will occur at the midpoint of the most recent quote spread less 2 points. Specifically, if the external market quote at the start of the match is "buy at 10, sell at 12", then the midpoint price is 11. Applying a price change of −2, the match occurs at a price of 9.

The liquidity curve depends on the dealer. Institutions are able to review and agree or disagree before use. At one end of the curve, price discovery could be very sensitive to size of imbalance, protecting the dealer. At the other end of the curve, price discovery could be indifferent to imbalance just like an ordinary match, hopefully attracting large orders. Of course the institution could always enter a limit and execute only if the price desired was met. But the key difference is that the institution can be guaranteed liquidity. Also, for institutions sensitive to it, negative selection is reduced.

At step 100, reinsurer 12 posts an amount that it is willing to trade, and at what price. The post from reinsurer 12 is visible only to dealer 10. This post can occur at any time prior to when dealer 10 wants to use the reinsurance market.

At step 110, dealer 10 posts its public and private match insurance rates. Dealer 10 has two insurance pools: a blind pool available at the public match insurance rates and a preferred customer pool available at the private match insurance rates. In the blind pool, the dealer does not know either who is the purchaser of the insurance or the party to whom the insurance commitment is kept. In the preferred customer pool, the dealer knows who is the purchaser of the insurance but fulfilling commitments remains anonymous.

Figure 4:
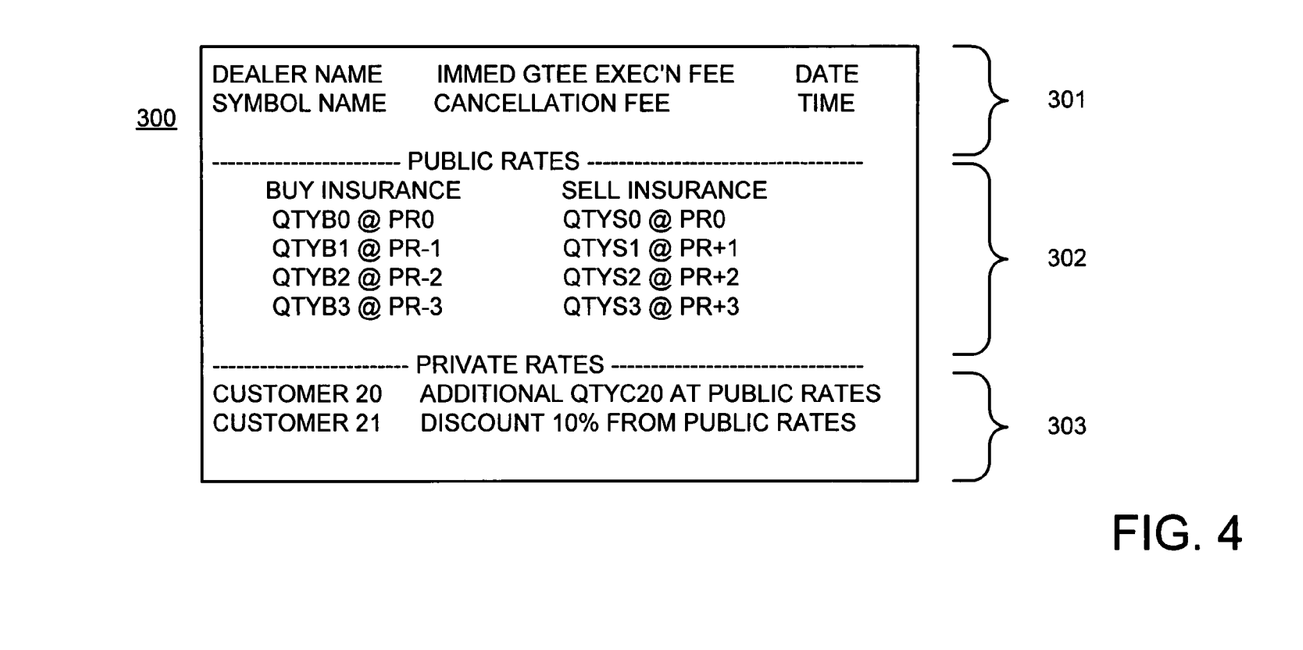
FIGS. 4 and 5 are data structure diagrams referred to in describing the present invention.

FIG. 4 shows match insurance rate display 300 having portions 301, 302, 303. Portion 301 is a header, including information such as the name of the dealer, the name of the symbol for which match insurance rates are provided, the dealer's cancellation fee, the dealer's immediate execution fee and the current date and time. Portion 302 provides public rates for match insurance. The rates may be provided separately for each price increment away from the match price, as shown in FIG. 4. Portion 303 provides private rates for match insurance, that is, dealer 10 may have separate arrangements with some or all of the market participants for providing match insurance at negotiated rates. Generally, the rates will specify one or more of increased liquidity and decreased price relative to the public quote.

At step 105, at least portions 301 and 302 of display 300 are made available to market participants 20, 21 and reinsurer 12, via "pushing" the information to the participants and/or enabling the participants to "pull" the information they want.

In some embodiments, no market data relating to match insurance is available to market participants 20, 21. In other embodiments, market data relating to match insurance is available to market participants that pay a fee for the match insurance market data.

Participants then submit market orders and/or limit orders to system 5 for inclusion in the match process, with the limits either relative to the match increments or absolute relative to an absolute price for the match.

Orders submitted to the match process specify the number of matches the order should be represented in, such as the next three consecutive matches; how the order should be distributed among the specified number of matches; and the desired disposition of unmatched shares.

One distribution technique is equally, such as 1/n shares per match for the next n matches. Another distribution technique is "historic trade day weighted", for example, (45%, 10%, 10%, 5%, 10%, 20%) for six matches and (47%, 10%, 9%, 11%, 23%) for five matches, and so on.

The desired disposition of shares is selected from (a) carryover to next match, (b) remove from match and immediately advise order owner of removal, or (c) act according to specified instructions.

It will be appreciated that a different type of match insurance may be required for limit orders, such as contingent match insurance.

Orders submitted to the match process also specify whether full match insurance is required for the entire order. If full match insurance cannot be obtained but it is required, then matching system 5 automatically rejects the order.

Figure 5:
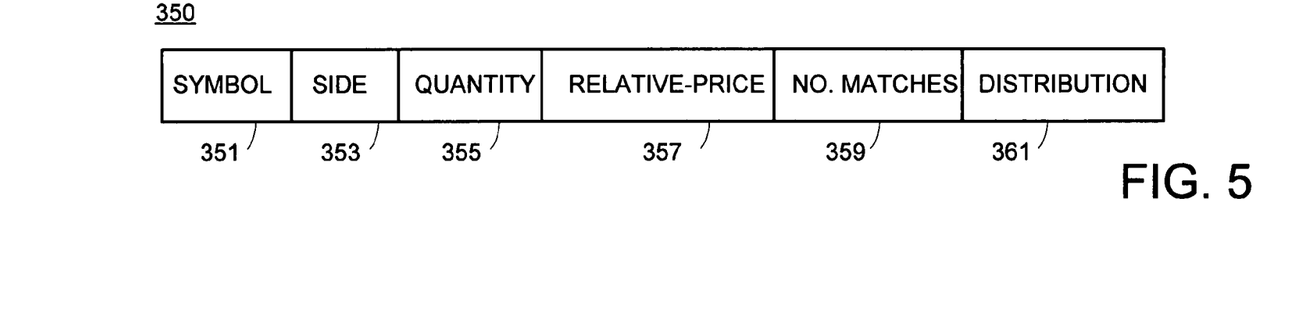

Assuming the order did not include a field specifying that full match insurance is required, at step 115, participant 20 decides to purchase match insurance and sends purchase request 350 to dealer 10, as shown in FIG. 5. Dealer 10 may support only selected fields of purchase request 350; these fields include:

symbol field 351 specifying the symbol of the order being insured, side 353 specifying whether buy or sell insurance is desired, order type 354 (not shown) specifying the type of the order, for example, market or limit, quantity field 355 specifying the number of shares for which match insurance is desired, coverage field 356 (not shown) specifying whether (i) insurance is required for the entire order or none of the order is to be insured, (ii) insurance is required for at least a specified number of shares of the order or none of the order is to be insured, or (iii) any amount of partial coverage is acceptable if full coverage cannot be obtained, relative-price field 357 specifying the insured price as a function of price increments relative to the match price, number of matches field 359 specifying how many matches the insurance is valid through, distribution field 361 specifying how the insurance shares should be distributed across the number of matches, such as "linear" or "weighted", and carry field 363 (not shown) specifying whether insurance unused in a match should be carried to the next match, if any, identified in number of match field 359.

It will be appreciated that participant 20 may wish to be anonymous, and sends match insurance purchase request 350 to an anonymity broker (not shown) who, in turn, forwards purchase request 350 to dealer 10.

In embodiments where participant 20 lacks match insurance market data, participant 20 must commit to purchasing match insurance before learning whether the match insurance is available. However, the order itself or match insurance purchase request 350 may be conditioned upon availability of match insurance for all or part of the order.

At step 120, matching system 5 automatically receives purchase request 350, automatically validates the format of the purchase request and ensures that participant 20 has established a payment method with dealer 10, and then automatically grants the match insurance on behalf of dealer 10. If the format is not valid, or participant 20 has not established a payment method with dealer 10, then the insurance is not provided. When the anonymity broker is used, the dealer does not know the identity of the purchaser of the match insurance. Matching system 5 advises dealer 10 when match insurance has been sold, and for insurance sold a privates rates, the identity of the insurance purchaser.

With present practices, charging a cancellation fee for orders withdrawn before the first match would be improper payment for a non-execution. Future trading practice may permit such cancellation fee. Under present practices, let it be assumed that a customer's order was partially matched, and the remaining unmatched portion was directed to the next (current) match.

At step 125, customer 20 decides to withdraw the remaining unmatched portion of its order from the match process, and cancels the corresponding match insurance by sending a cancellation message to dealer 10. Under present practices, customer 20 is not allowed to cancel before the first match. At step 130, dealer 10 automatically received the cancellation message, validates its format, applies the cancellation, credits a pro-rated portion of the premium paid for the insurance less the cancellation fee, and confirms to customer 20 that the cancellation occurred. Thus, the credit for the match insurance cancellation appears as an adjustment to an execution fee.

At step 145, customer 21 decides to obtain an immediate execution guarantee at the to-be-determined match price, and sends an immediate execution guarantee purchase request to dealer 10. At step 140, dealer 10 automatically receives the immediate execution guarantee purchase request, automatically validates the request, and if valid, automatically provides the requested execution guarantee to customer 21.

At the moment of match, the auction zero is computed. Relative limit prices are converted to absolute prices. The match price is then determined in two stages.

First, market orders are converted to priced bids and offers by applying the market order imbalance to the dealer liquidity curve. Example: if the market order imbalance is a Sell imbalance of 70,000, the curve published at the opening of the match might indicate down 2. The market Buys and Sells, though not the contingent Buys and Sells purchased as insurance, are treated as Bids up to this price (down 2), or Offers down to this same price.

Second, limit orders are factored in. What has been produced now is a priced book of bids and offers.

The allocation is made to honor all the individual insurance deals, including execution guarantees, but to maximize overall shares traded within that. This means a customer will pair with match insurance shares if that allows another customer to match as well, as there is no financial difference to the person who bought the match insurance.

Let it be assumed that customer 20's order in the match was not matched. In one embodiment, at step 155, customer 20 exercises the match insurance purchased from dealer 20 to ensure that its order is matched at the match price; the exercise is accomplished by sending an appropriate message to dealer 10 within a predetermined time possibly via the anonymity broker, when appropriate. At step 150, dealer 10 automatically receives the exercise insurance message from customer 20, validates the message, and if valid, automatically provides a match and execution report to customer 20.

In another embodiment, at step 155, matching system 5 automatically exercises as much match insurance as required to match customer 20's unmatched order, subject to insurance availability due to prior purchase by customer 20. Matching system 5 then creates an insurance execution message, and sends the insurance execution message to dealer 10.

At step 160, dealer 10 automatically detects that due to exercise of match insurance, its inventory has grown (or shrunk) beyond a predetermined threshold, checks whether there is anything in the reinsurance market at an acceptable price, and if dealer 10 wishes to use reinsurance, dealer 10 notifies reinsurer 12 in an appropriate manner. At step 165, reinsurer 12 receives the notification from dealer 10.

The dealer runs the risk of being required to buy or sell shares at the match price. The dealer has two incentives in compensation: the brokerage for everything done in the match and whatever the match insurance premiums are. But there is another factor. Although the dealer does not know what the match imbalance is, the dealer can make an educated guess from the amount of match insurance sold, and so ought be able to surmise the match price. For instance, if there are a lot of people buying Buy Guarantees, the dealer could surmise there will be an imbalance of Sells and so can sell in the open market as a hedge. So there is also a chance for short-term straight dealer profit as well. It will be appreciated that the dealer could make all manner of package deals across stocks.

An embodiment wherein the match price is related to a VWAP will now be discussed.

The VWAP match embodiment is similar to the liquidity curve embodiment described above. For brevity, only key differences are discussed.

Instead of dealer 10 publishing a liquidity curve, dealer 10 publishes a definition of what match price methodology it supports. For example, dealer 10 may elect to provide insurance for matches that occur at a forward VWAP for the period between a match and a subsequent match. Specifically, a match at 1 p.m. uses the 2 p.m. volume weighted average price for all trades that occur between 1 p.m. and 2 p.m. Dealer 10 takes the entire imbalance of the match at the published VWAP.

It will be appreciated that insuring a match at a forward VWAP is safer for dealer 10 than insuring a match at a backward (historical) price.

Portion 302 of FIG. 4 shows rates at VWAP, possibly varying in accordance with the number of shares of match insurance purchased.

Steps of the VWAP match embodiment include:

A. The Dealer Match system is configured for a pre-defined number of Match Periods during a trading day.

B. At the beginning of each day, the dealer will adjust commitments and prices for Blind Pool, Best Pools, and adjust limits for firms in the Blind Pool (special pools are done interactively during the trading day).

C. The next Match Period begins.

D. At the match point of the next period, the forward-looking VWAP is calculated.

E. Final reports are sent to the firms (traders) giving the status and prices of their executed orders in the previous period.

F. Final reports are sent to the dealers giving the final status and prices of their executed orders in the previous period.

G. The match is now open to accept orders from traders.

H. Firms (traders) enter their Buy/Sell orders indicating the number of shares, number of match periods and whether they want to acquire insurance. The firm also indicates whether the order is valid only if insurance is available when the order is entered.

I. The general insurance pool is available on a first-in-first-served basis.

J. The firm receives a response from the system that shows the order was accepted. If insurance was requested, the response indicates the amount and cost of insurance.

K. If the remaining quantity in the insurance pool is insufficient to cover the new order quantity, the trader will have the following three entry options to the match:
  Submit order with specified number of shares; no insurance required
  Submit order with specified number of shares; insurance is required-if there is no insurance available, take my order out.
  Submit order with specified number of shares; take as much insurance as is available L. The orders are posted to the match book.

M. Firms (traders) can cancel or add shares to pending orders up until a short time before the matching process itself takes place (time TBD).

N. Orders can be modified whether they were insured or not.

O. The match begins—the buy order quantities are summed and the sell order quantities are summed.

P. If one side is smaller than the other, the orders on the surplus side of the imbalance are allocated a fraction of the smaller side equal to the ratio of (smaller-side quantity/larger-side quantity) multiplied by the larger-side order quantity.

Q. The quantity the dealer needs to supply to cover the match insurance sold is computed.

R. An initial report is sent to the dealer that indicates the dealer's obligations from the blind insurance pool and the private insurance pools (special and best pools)

S. Preliminary reports are sent to the firms (traders) containing the executed quantity of their orders without the price that will be calculated at the subsequent Match Period.

T. Insured shares are executed in historic time slice proportions. Uninsured shares are put (in total) into the first available match, and any unexecuted shares in the match are rolled over if that is consistent with the defined number of Match Periods. For instance: Let us assume for a stock the historic time slice proportions are 50%, 10%, 10%, 10%, 10%, 10%. If a trader submits 100,000 shares and insures them all, the shares are submitted to the matches in the proportion, i.e. 50, 10, 10, 10, 10, 10.

U. Any unused portion of the dealer pool quantity that can be rolled into the next match is added to the available pool.

V. Any unmatched order quantity that can't be rolled into the next match is cancelled.

Figure 3:
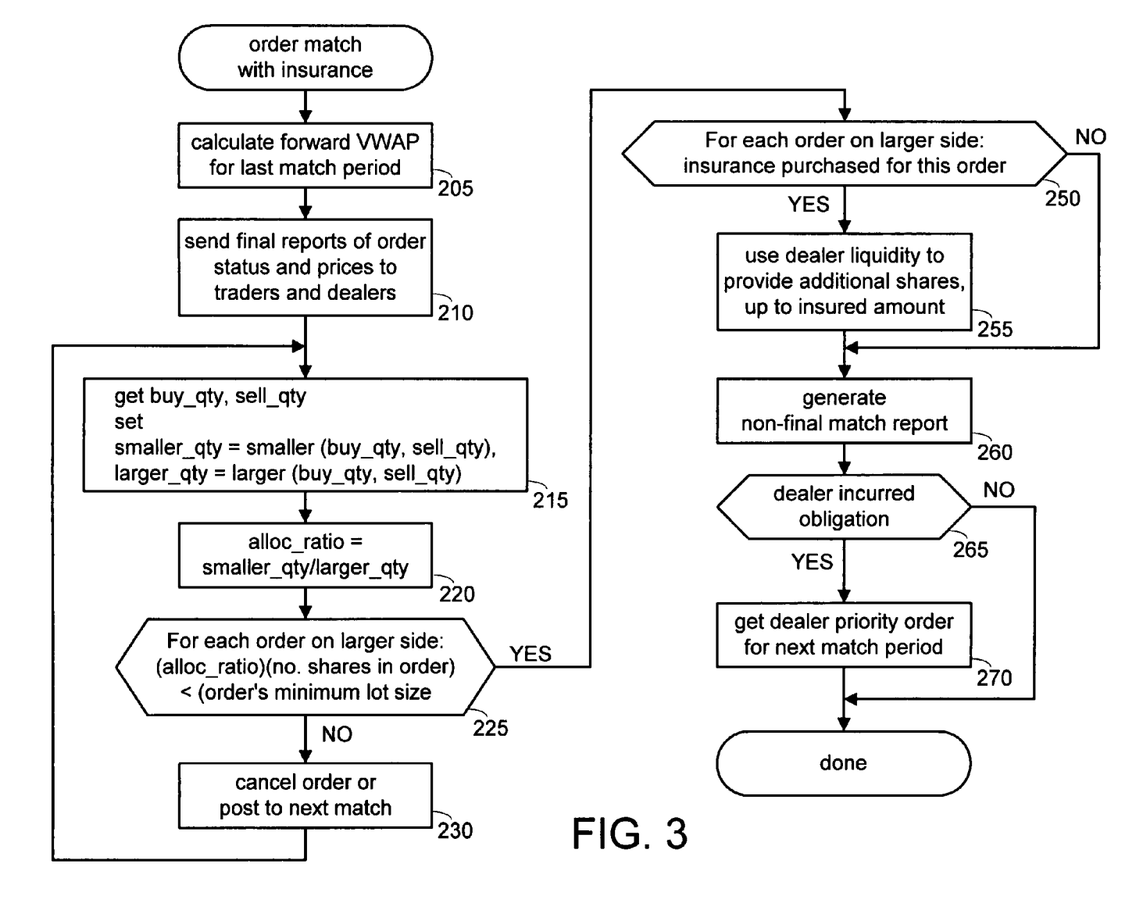
FIG. 3 is a flowchart showing match processing at VWAP.

FIG. 3 is a flowchart showing match processing at VWAP.

At step 205, matching system 5 calculates the forward VWAP for the last match period and at step 210, send final reports showing order status and prices to traders and dealers participating in the last match.

At step 215, the buy order quantity and the sell order quantity is determined, and the larger and smaller quantities are associated with the appropriate buy or sell quantity. Usually there is an imbalance in the number of buy and sell orders.

At step 220, the allocation ratio is determined as the smaller quantity divided by the larger quantity. The smaller side (buy or sell) is proportionately allocated to the larger side based on the ratio of the smaller side to the larger side. For example: if the buy quantity is 1,000,000 shares and the sell side is 500,000 shares, every buy order will be allocated half (500,000/1,000,000) its quantity in sell shares.

At step 225, for each order on the larger side, the minimum lot size of the order is checked. If the minimum lot size of the order cannot be met, the order is removed from the match. At step 230, depending on the order's parameters, it will be either cancelled or posted to the next match, and processing continues at step 215.

When all orders on the larger side have their minimum lot size satisfied by the quantity on the smaller side allocated to the respective larger side order, processing continues at step 250.

At step 250, for each larger side order, matching system 5 checks whether insurance was purchased for the order, and if so, at step 255, the dealer liquidity is used to satisfy any unmatched Buy or Sell orders, up to amount of insurance sold to the firm (traders).

At step 260, matching system 5 generates a non-final report that displays the original orders, the matched quantities of those orders and the status of any unmatched quantity (i.e. whether it the unmatched quantity has been rolled to the next period or cancelled).

At step 265, matching system 5 checks whether the dealer providing insurance incurred an obligation it must cover. If so, at step 270, matching system 5 determines the amount of the imbalance that the dealer is posting to the next Match Period as a priority order, i.e., the dealer's order will be completely filled prior to the other orders being matched.

In some embodiments, multiple dealers compete in providing match insurance for the same market.

Table 1 shows screen displays available to all traders and dealers using matching system 5. The "select for" field indicates how the user can limit the displayed data. The "stub" field indicates the categories the data can be broken into.

TABLE 1

| screen name | select for | stub | shows |
|---|---|---|---|
| Match Status | all stocks select stock | | Operational status, no. matches, match times, stock halts, stock assignments and so on. Explanatory material |
| History Screen | by stock by time period | by date | Day by day history of match with natural match rates, blind pool commitment, insurance sold |

Table 2 shows screen displays available to a trader, and actions the trader can take from these screens. A screen display of match reports is also available.

TABLE 2

| screen name | select for | stubs | shows | actions |
|---|---|---|---|---|
| Commitment Screen | by stock by dealer | | Shows blind pool amount by match, best | Trader may use screen as input and get immediate response as to insurance. |
| Position Screen | by stock | by match | Show status of all trader's entries: entered orders, insurance purchased, matches | Trader may cancel up to closing of match input for any match. For a fee, Trader may cancel insured shares subject to a minimum execution amount. |

Table 3 shows screen displays available to a dealer, and actions the dealer can take from these screens. "Available" means when the data is available. Note that a corresponding version of the trader's Commitment Screen is available to a dealer. Although match commitments are made on a long term basis, the dealer has an opportunity to roll over unfilled commitments from match to match. So, commitment levels may be considered minimums. Deals entered by dealer and needing customer confirmation can be canceled any time before a match; these shares do not have priority. Matching system 5 tracks and pairs trades done within the system, and delivers a net report.

TABLE 3

| screen name | available | select for | stubs | shows | actions |
|---|---|---|---|---|---|
| Commitment/ Limit | always | by stock; by customer; by match | Change History (who, when); Blind Pool (no. shares, approx. share value, fee); Best Pool (limits by firm, no. shares, approx. share value, fee); Commitment by firm; Interactive Pool; Itemization of packages, deals | Current outstanding Commitment, shares, approximate share value, rates for all pools (limits for blind pools) | Blind Pool minimum set before open; may be added to; unfilled insurance may roll over. Reset firm limits for next match. Reset commitment by firm for next match. Itemization entered interactively with confirmation from customer needed. |
| Insurance Sold | during match period | All stocks; by individual stocks; by customer | Total; Blind pool (shares no. value sold/premiums); Best pool (shares no. value sold/premiums); Special pool (shares no. value sold/premiums by deal) | Shares sold and still available; total premiums (buy, sell); own position; deal inquiries | |
| Own Position | from stock rolled over | | | own rollover shares riding in match; voluntary shares | |
| Inquiries | real time | | by source; by time; by inquiry | Open inquiries | Respond to deal inquiries |
| Reinsurance Market | during match period | all stocks; each stock | all entries; by price required | Offers for reinsurance | Can take up to amount outstanding |
| Match Results | just after match | all stocks; by stock | Reinsurance offers appropriate to this position | Obligations; shares long/short; approximate value; unfilled commitments; shares long/short | Dealer can choose to roll over or to apply reinsurance offers; can click to roll over unfilled commitments to next match |
| Position | at the end of each match | all matches; by stock; by match | offsetting transactions | Recapitulates all matches to date and shows current obligations both unpriced or priced with current status | |
| Transaction Summary | any time | by stock; by customer | | Summarizes transactions showing making of commitments, inquiries, administrative responses (i.e., interactive pool), taking of commitments (insurance purchase), obligation to be fulfilled after matches, rolls over, assignments to reinsurance pool | |

System administrator entries and displays consist of the following:
  System management and control entries
  Analysis tools
  Configuration of dealer and traders terminals
  Assigning symbols to dealers
  Adding and deleting available symbols
  The default number of matches
  Number of matches for specific symbols
  Minimum order quantity for each symbol
  The percent (%) of the volume traded during a Match Period for each symbol
  Whether match insurance is available for each symbol
  Broadcast messages
  Displays or reports
  Users connected to the system
  Display of activity on the system
  Exception messages and conditions The Dealer Match System provides the data for regulatory reporting, clearing and billing, and the following reports:
  Following every match the quantity and prices to be printed on the tape
  NSCC reporting for locked in trades
  Daily trading activity and commission reports to be retrieved by the dealers and traders
  Monthly billing reports
  Daily and monthly statistical reports Using the web based access screens (or other access method of access) the dealer can enter or display:
  The insurance limit for the "pool".
  Add new special clients, and specify their private insurance limit.
  Specify the cost of insurance for "pool" and "private" clients.
  At the end of the match, the dealer gets a match report screen which shows (by stock):
    Share obligation from that match (to be ought or sold at next VWAP)
    Total outstanding share obligation (all matches that day)
    The reinsurance market
  The dealer can indicate how many shares to roll or what shares to pair with what orders in the reinsurance pool. The dealer has only a 5-minute window to access the reinsurance market after each match.
  Whether the imbalance that the dealer must cover should be rolled into the next match as an order.
  Whether the unused insurance quantity for a specific match should be rolled into the next and made available as insurance.

The dealer screens also allows the dealer to view:
  The amount of buy and sell insurance purchased by the "pool" and by special clients on a per match basis and cumulatively.
  The dealer's current exposure in terms of quantity and price.
  The buy and sell quantity available for use as reinsurance.
  The amount of insurance commissions collected.
  The amount paid out for use of institutions' orders as reinsurance.
  The dealer's net on a per match basis and cumulatively
  See the screen summary for more detail.

Using the web based screen (or other access methods) traders will specify the following parameters when submitting their orders to be matched:
  The number of matches the order should be posted to.
  If match insurance is desired, and the desired number of shares.
  The account the match insurance should come from (pool or private).

Using the web based screen (or other access methods) institutions will specify the following parameters when submitting their inventory:
  The number of shares to buy or sell
  The fee per share they will charge dealers if the dealer uses the institution's shares In another embodiment, the Dealer Match System is implemented on the InterELF platform using standard InterELF components: ELF Manager, ELF, and Umpire. Dealers and traders will be connected to the InterELF platform either directly form their Order Management Systems (OMS) or via the Internet using a web browser or other connectivity services. The platform, dealer umpires and trading ELFs are described in co-pending U.S. patent applications having Ser. Nos. 09/801,848, 09/601,588, 09/802,025, each filed on Feb. 4, 2001, and each having a common inventor herewith; the disclosure of each is hereby incorporated by reference.

The ELF Manager contains several options to enable interface to the InterELF platform with minimal or no changes to the OMS's participating dealers or traders. Examples of the options to be provided could be different destinations to identify different parameters of the order: with or without insurance, cancel order if insurance is not available, etc.

When connecting via the web, following a successful log on to the InterELF platform, a small applet is downloaded to the dealer or trader terminal to control the persistent connection between the terminal and the system.

The order is sent to an ELF Manager that routes the order to the trader's ELF. The trader can have his/her own ELF Manager, which would be the case if orders were submitted by an order management system. Those traders that only interact with the system via the trader terminal can share an ELF Manager. The ELF Manger will enable the receipt and delivery of orders, confirmation of orders, cancellations and modifications to pending orders and reports following each match.

The dealer screen is implemented as a browser applet. The terminal allows the dealer to view insurance purchases from the pool and private accounts, view the reinsurance book, and view the dealer's position for each match and the entire day.

In the simple case, the ELF routes the order to the umpire when it is received. Since a decision table governs the ELF's actions, the trader can substitute the standard decision table with one that implements a more sophisticated trading strategy.

The ELF posts the order to the Dealer Match umpire. At the times designated by the system parameters, the umpire performs the match. Reports detailing each order's status after the match are sent by the umpire to the dealers and traders via the ELF and ELF Manager.

The Dealer Match matching method contains several options as to how and when the order should be matched. Consequently, the orders posted to the umpire must contain additional fields to support these options. Likewise there is a need for two books in the umpire, one for regular orders that are to be matched at the next match, and a second book containing the orders that can be used for reinsurance.

In another embodiment, a trader pays a first fee to a dealer to be available to provide match insurance for all of the trader's orders, and then pays a second fee to the dealer if match insurance is actually activated to fill at least part of a particular order for the trader. This is an example of a special arrangement between a trader and a dealer.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method of executing an order, comprising:
receiving a first order to buy or sell a first quantity of a security, the first order having match insurance that guarantees that an insured quantity of the first order will be executed at a match price set in a match process even if the insured quantity of the first order is not executed in the match process, the insured quantity being less than or equal to the first quantity;
storing the first order in a memory of a computer;
receiving, by the computer, any other orders on the same buy or sell side as the first order;
storing, in the memory of the computer, said any other orders on the same buy or sell side as the first order;
receiving at least one second order to transact a second quantity of the security, the at least one second order being on the other buy or sell side of the first order;
storing the at least one second order in the memory of the computer;
executing, by the computer, the match process that
a) sums the quantities of the first order, and said any other orders on the same buy or sell side as the first order, to generate a first side sum,
b) sums the quantities of the at least one second order to generate a second side sum,
c) determines that the first side sum is greater than the second side sum,
d) matches a portion of the first order with a same-sized portion of the at least one second order at the match price, the matched portion being less than the insured quantity, leaving an insured remainder as the difference between the matched portion and the insured quantity; and
executing, on the computer, the insured remainder with a contra-side quantity of the security from a provider of the match insurance at the match price.

2. The method of claim 1, further comprising creating a priority order corresponding to the contra-side quantity on behalf of the provider of the match insurance, and submitting the priority order to a next match process wherein the priority order receives matching priority in the next match process.

3. The method of claim 1, further comprising providing market data relating to match insurance prior to running the match process.

4. The method of claim 1, further comprising receiving a request for match insurance for the order, and
providing, by the computer, the requested match insurance on behalf of the provider of the match insurance.

5. The method of claim 1, further comprising
receiving a request for match insurance for the order,
determining, by the computer, that the request cannot be fulfilled,
rejecting the order instead of storing the order.

6. The method of claim 1, wherein the match price is set as a function of an external price.

7. The method of claim 6, wherein the match price is set using a liquidity curve.

8. The method of claim 6, wherein the external price is a volume weighted average price (VWAP).

9. The method of claim 4, wherein the contra-side quantity is provided by either a blind pool or a known customer pool.

10. The method of claim 1, further comprising sending an insurance execution message to the provider of the match insurance.

11. The method of claim 1, further comprising checking whether use of the contra-side quantity causes an inventory of the provider of the match insurance to cross a predetermined threshold, and if so, notifying a reinsurer that the provider of the match insurance is executing against a quote provided by the reinsurer.

* * * * *